(12) United States Patent
Dietrich et al.

(10) Patent No.: US 6,688,156 B2
(45) Date of Patent: Feb. 10, 2004

(54) TESTER FOR PRESSURE SENSORS

(75) Inventors: Claus Dietrich, Sacka (DE); Botho Hirschfeld, Dresden (DE); Dietmar Runge, Groberkmannsdorf (DE); Michael Teich, Moritzburg Ot Friedewald (DE); Stefan Schneidewind, Reichenberg (DE)

(73) Assignee: Karl Suss Dresden GmbH (DE)

( * ) Notice: Subject to any disclaimer, the term of this patent is extended or adjusted under 35 U.S.C. 154(b) by 310 days.

(21) Appl. No.: 09/754,711

(22) Filed: Jan. 4, 2001

(65) Prior Publication Data
US 2002/0152794 A1 Oct. 24, 2002

(30) Foreign Application Priority Data
Jan. 4, 2000 (DE) .......................................... 100 00 133

(51) Int. Cl.$^7$ ............................................... G01L 27/00
(52) U.S. Cl. ........................................................ 73/1.68
(58) Field of Search ................................. 73/1.57, 1.58, 73/1.68, 706, 715–756, 1.63, 1.64, 1.71

(56) References Cited

U.S. PATENT DOCUMENTS

| | | | | |
|---|---|---|---|---|
| 5,067,100 A | * | 11/1991 | Bissell et al. | 702/98 |
| 5,900,530 A | * | 5/1999 | O'Brien et al. | 73/1.57 |
| 6,581,436 B2 | * | 6/2003 | Mannhart | 73/1.68 |

* cited by examiner

*Primary Examiner*—William Oen
(74) *Attorney, Agent, or Firm*—Baker Botts LLP

(57) ABSTRACT

The invention relates to a tester for pressure sensors in the wafer compound or isolated pressure sensors having a recess for the pressure sensors as well as means for electrical contacting of the electrical connections of at least one of the pressure sensors. The invention is intended to make it possible to test pressure sensors still in a wafer compound for their function. According to the invention, a pressure head is provided which has an interior space open on one side, the open face of which is capable of being mounted on the pressure sensor in such a way that the interior space is tightly sealed by the latter. In this way a static or dynamic pressure of specified amount and duration can be exerted on the sensor element at least so that the sensor element is moved out of its resting position. At the same time, the electrical connections of the selected pressure sensor are connected with an electrical evaluation unit.

24 Claims, 5 Drawing Sheets

TESTER FOR PRESSURE SENSORS

FIELD OF THE INVENTION

The invention relates to a tester for pressure sensors in a wafer structure or for isolated pressure sensors as well as for isolated open pressure sensors having a recess for the pressure sensors as well as means for electrical contacting of the electrical connections of at least one of the pressure sensors.

BACKGROUND OF THE INVENTION

Pressure sensors on a micromechanical basis contain a pressure-sensitive element that upon the application of pressure are at least partially deflected from a resting position. As a result of this deflection/bending, a change in electrical voltage similar to a piezoelectric structural element is indicated. This change in electrical voltage is generally amplified by a corresponding evaluation circuit and is largely proportional to the compressive load. Such pressure sensors are commonly produced by semiconductor technology in a wafer compound and have, for example, a sensor chamber etched into the silicon substrate, one side of which is designed as a diaphragm or sensor element, and which are provided with an aperture or a sensor intake facing this sensor element. In addition, electrical connections for the power supply for the reading the measured values are found on one side of the pressure sensor, while logic circuits and/or amplifying circuits may also be incorporated.

After completion of the pressure sensors in a wafer structure, the sensors are separated by abrasive cutting into individual pressure sensors/chips, which are then assembled in housings. This final assembly is then followed by functional testing and, if necessary, calibration of the amplifier circuit to the pressure sensor, while any defective pressure sensors are removed.

It is apparent that the fabrication of pressure sensors requires a considerable expenditure of resources and that it is especially disadvantageous that functional testing of pressure sensors is only performed in the completed state.

OBJECTS AND SUMMARY OF THE INVENTION

An object of the invention therefore is to provide a tester for pressure sensors which can test pressure sensors which are partially assembled, pressure sensors that are still in the wafer structure, as well as isolated open pressure sensors for their proper function and with which it is possible to accommodate the functional characteristics of the pressure sensors.

The object on which the invention is based is accomplished in a tester by which a static or dynamic pressure of a specified amount and duration is capable of being exerted on the sensor element of at least one selected pressure sensor so that its sensor element is moved out of its resting position while the electrical connections of the selected pressure sensor are connected with an electrical evaluation unit.

A first embodiment of the invention includes an assembly that is designed as a pressure chamber for the production of a static pressure, in which the tester is wholly or partially arranged with the pressure sensors located in a recess.

In a second embodiment of the invention, a pressure head is provided which has an interior space open on one side, the open face of which is capable of being mounted on the selected pressure sensor in such a way that the interior space is tightly sealed by the latter. When the tight seal has been obtained, the desired internal pressure can then be built up, including for example stepwise, and the varying electrical parameters on the electric contacts measured.

This makes it possible to select each of the pressure sensors in the wafer structure successively and to mount it on the pressure head accordingly. In addition, this design also makes it possible to test the operation of individual pressure sensors removed from the wafer structure or even partially assembled pressure sensors.

In addition, the pressure head can be connected with a device for the production of a specified pressure in the interior space of the same.

For the control of internal pressure, a pressure-measuring probe is preferably located in the interior space of the pressure head.

In an additional embodiment of the invention, an arrangement of electrical connections of the pressure sensor is assigned to the pressure head. This electrical contacting may be effected by needle probes provided in the interior space of the pressure head. This is advantageous when the electrical connections are arranged on the upper surface of the pressure sensor.

Since the electrical connections may alternatively be provided at a different location on the pressure sensor, another embodiment of the invention is characterized in that the arrangement of the electrical connections of the pressure sensor and the pressure head are positionable independently of one another on or under the selected pressure sensor.

In order to obtain a sufficient seal between the pressure head and the pressure sensor, in another embodiment of the invention the pressure head is capable of being mounted on the pressure sensor with a specified compressive force, where the compressive force is produced by a weight or elastic force. There the face of the pressure head may be designed as a sealing surface, or a sealing element can be inserted in the face. The compressive force required for a sufficient seal may alternatively be produced by suction with vacuum. To this end, a vacuum groove that is connected with a vacuum-producing device, is incorporated in the face of the pressure head.

A third embodiment of the invention includes a thermochuck for the accommodation of pressure sensors located in the wafer structure. In this case, the wafer is arranged face down on the thermochuck in such a way that the sensor intakes of the pressure sensors, arranged in a grid, rest directly on the thermochuck. The thermochuck is provided with a grid of holes, and the grid of the sensor intakes matches the grid of the holes of the thermochuck. This embodiment of the invention is generally provided for pressure sensors in which the electrical connections lie on the back, i.e., are arranged on the side that faces the sensor element.

In order to ensure sufficient adhesive force on the thermochuck during the application of pressure to individual pressure sensors, the holes in the thermochuck are selectively individually connectable with a means for production of a positive pressure or with a means for production of a negative pressure such that if a positive pressure is produced in a hole, then adjacent holes must simultaneously be impacted by a negative pressure.

In order to reduce the expenditure for control of the pressure applied to the holes, a preferred refinement of the invention that the holes are capable of being acted on by pressure in a groupwise or alternatively linewise manner, and the holes adjacent to the selected group or line are capable of being acted on by negative pressure, also in a groupwise or linewise manner. For establishing electrical contact, the pressure sensors of a selected line can be electrically contacted simultaneously, so that simultaneous evaluation of the test results is possible.

A fourth embodiment of the invention is characterized in that a pressure head for production of a flow in the direction of a sensor intake or a sensor element of a selected pressure sensor for production of a dynamic stagnation pressure is provided. This embodiment of the invention, universally applicable per se, is especially suitable for pressure sensors that have a particularly sensitive or uneven surface structure since, in contrast to the other embodiments of the invention, it is not necessary here for the pressure head to be mounted on the pressure sensor. Hence, the risk of any mechanical damage is avoided.

The pressure head is preferably equipped with a vertically aligned tubule whose lower opening in working position ends at a specified distance above the pressure sensor and whose other end is connected with a pressure-measuring chamber and a test pressure supply line.

Since the pressure head is positioned over each selected sensor element, a further development of the invention is characterized in that, at the tubule in the region of its lower opening, a plurality of needle probes are provided for establishing electrical contact with the electrical connections of the pressure sensor. The needle probes are capable of being mounted on the electrical connections of the pressure sensor in the elastic region.

In addition, it is also possible to provide an ordinary test card for electrical contacting of each selected pressure sensor and a pressure head which is positionable on the selected pressure sensor independently of the test card.

In another variant of the invention, a test card for electrical contacting of each selected pressure sensor is provided where the pressure head is positionable on the selected pressure sensor jointly with the test card.

The pressure head for production of a static pressure, as well as the pressure head for production of a dynamic stagnation pressure, may be fastened to an X-Y-Z cross table.

BRIEF DESCRIPTION OF THE DRAWINGS

The invention will be explained in detail below by means of examples. In the accompanying drawings.

DETAILED DESCRIPTION OF PREFERRED EMBODIMENT

Figure 1:
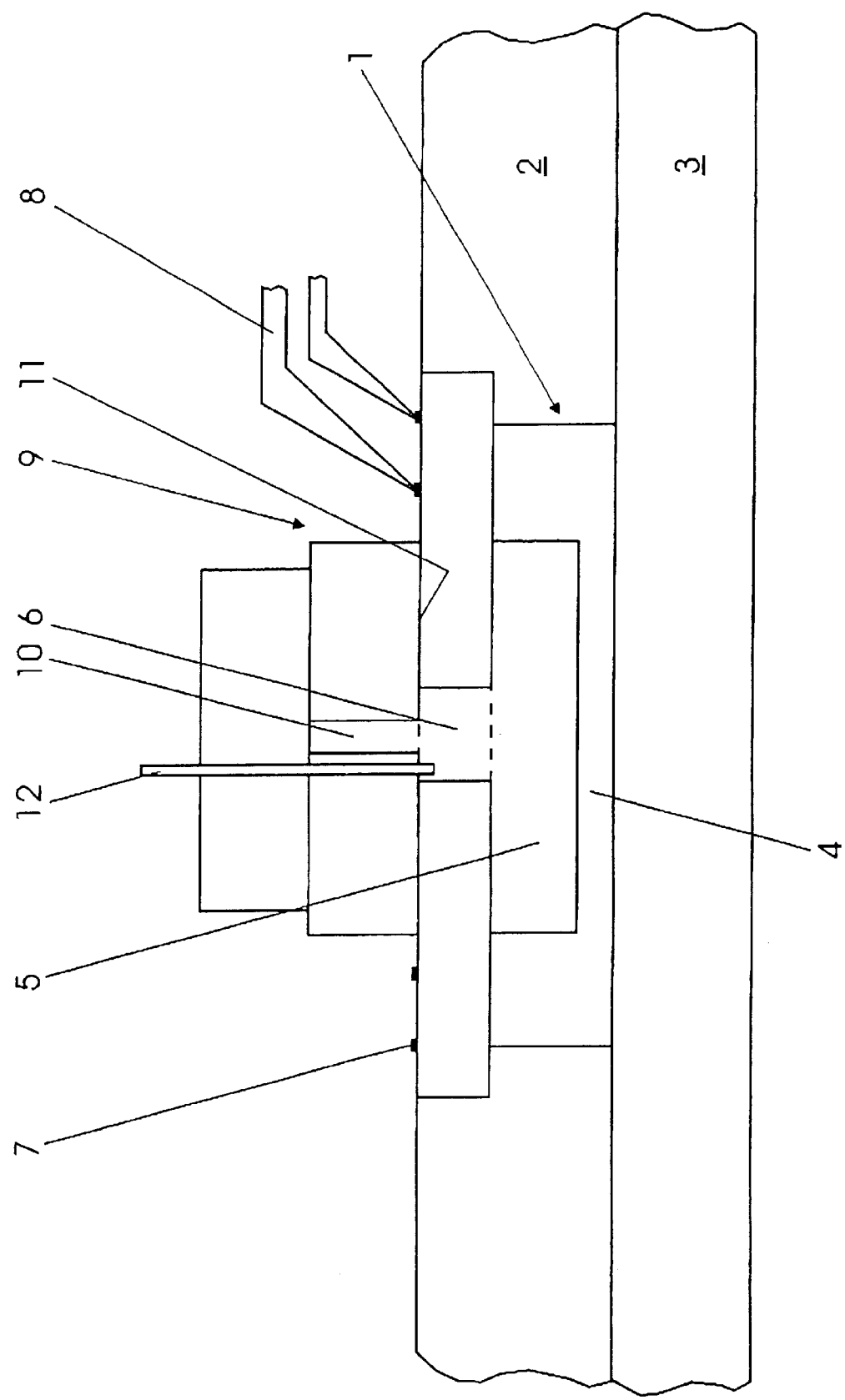
FIG. 1 is a simplified cross-sectional view of an embodiment of the invention with a pressure head for production of static pressure in a pressure sensor.

FIG. 1 shows a micromechanical pressure sensor 1 that is still in the structure of a wafer 2 (the adjacent pressure sensors are not represented). The wafer 2 is fastened to an ordinary thermochuck 3. Alternatively, a simple chuck may of course also be used.

The pressure sensor 1 contains a sensor element 4, which delimits an interior sensor space 5 on one side. A sensor intake 6 is located on the side of the pressure sensor 1 facing the sensor element 4. The pressure sensor 1 may be connected via this intake 6 with another delimited space whose internal pressure is to be determined. In addition, an integrated circuit is provided in the region of the sensor intake 6 for amplification of the voltage change produced by the sensor element 4. The power supply of the pressure sensor 1 and the reading of the measured values are provided via electrical connections 7, which in the example represented are arranged on the upper surface of the pressure sensor 1.

Ordinary test cards, as used in commercially available wafer testers, may be employed for establishing contact with the electrical connections 7. In this regard, the needle probes 8 of the test card simply have to be mounted on the electrical connections 7 and connected at the other end to an electrical evaluation unit. Subsequently, or at the same time, a specified internal pressure is produced in the pressure sensor 1. For this purpose, a pressure head 9 is provided which has an interior space 10 open at one side. The open face 11 of the interior space 10, according to the embodiment of Fig. 1, is mounted on the selected pressure sensor 1 in such a way that its interior sensor space 5 is tightly sealed. At the same time, a weight or elastic force is exerted on the pressure head 9. When the tight seal has been obtained, the desired internal pressure may then be built up, including for example in a stepwise manner, and the varying electrical measured variables measured at the electrical connections 7. For this purpose, the pressure head 9 is connected with a device for the production of the specified internal pressure. A pressure-measuring probe 12 which extends into the interior space 5 of the sensor is provided for exact determination of the internal pressure obtained in the interior sensor space 5 in each instance.

If the pressure head 9 is fastened to an X-Y-Z positioning table, the pressure sensors 1 in the wafer structure can be successfully selected and the pressure head 9 mounted on the corresponding pressure sensor 1. The pressure sensors 1 can be located in a wafer structure or removed from the wafer structure. In addition, partially assembled pressure sensors 1 can also be selected and tested.

In addition, the possibility exists of fastening the pressure head 9 directly to the test card and positioning this assembly above each selected pressure sensor 1. It is also possible to fasten the needle probes 8 directly to the pressure head 9.

The dimensions of the pressure head 9 are selected in such a way that the electrical connections 7 remain free, and are freely accessible to the probes 8.

Figure 2:
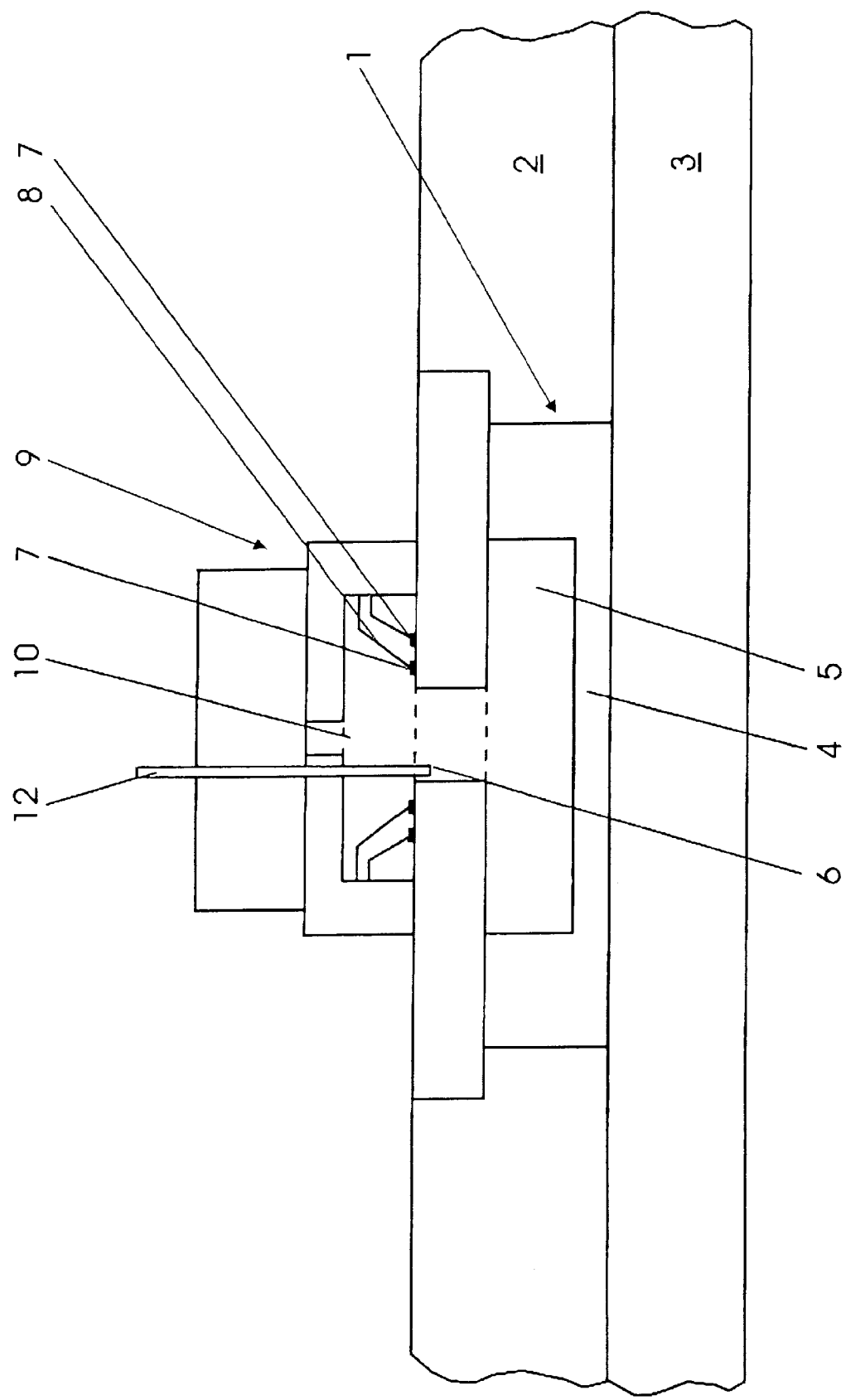
FIG. 2 is a cross-sectional view of another embodiment of the invention according to FIG. 1, but with inside probes for electrical contacting of the pressure sensor.

FIG. 2 shows a variant of the pressure head 9, wherein an enlarged interior space 10 is provided so that the needle probes required for electrical contacting can be arranged in this interior space. Otherwise, there are no other substantial differences from the embodiment of FIG. 1.

Figure 3:
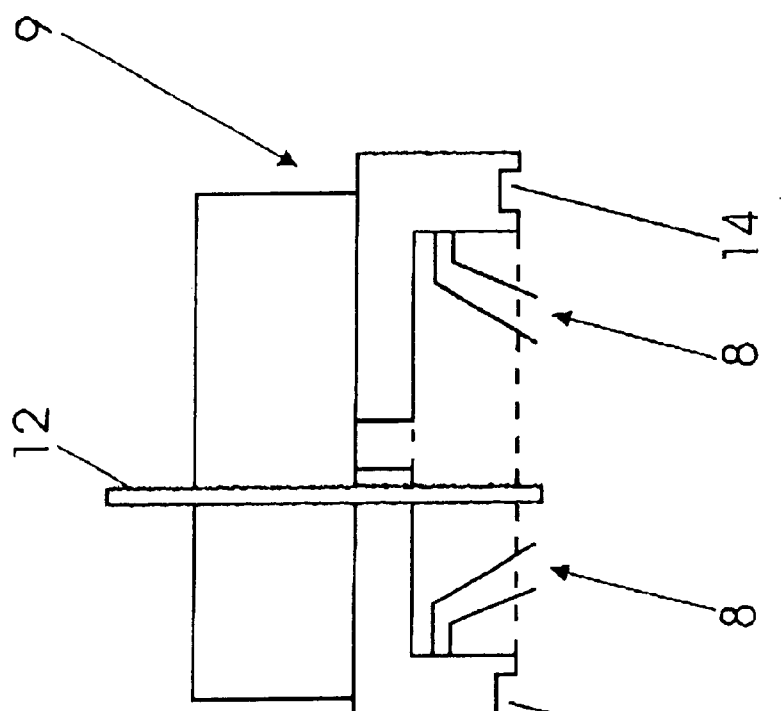
FIG. 3 is a cross-sectional view of a pressure head with a sealing element arranged on the face, for tight mounting on a pressure sensor.
Figure 4:
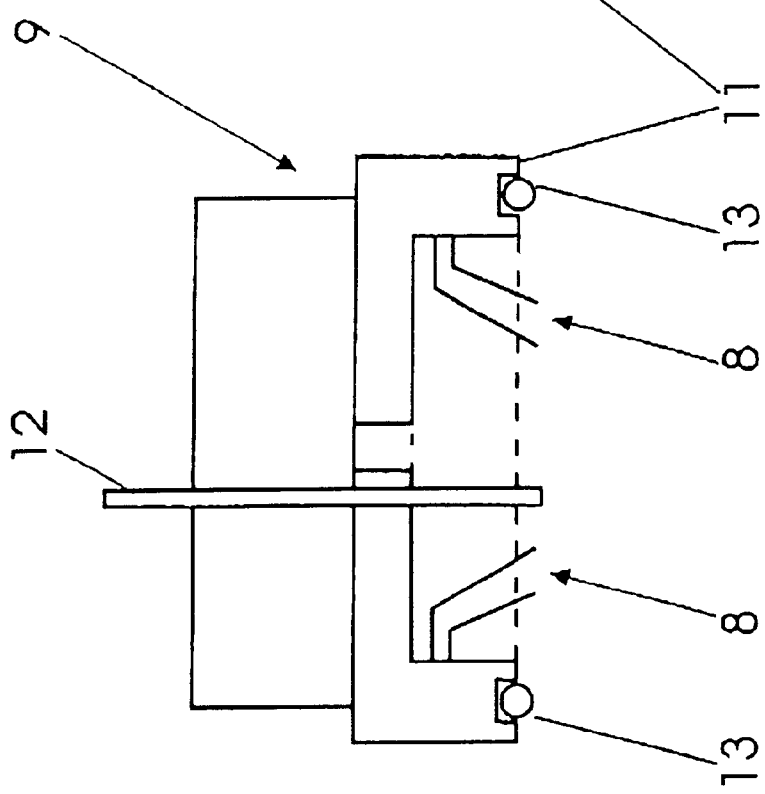
FIG. 4 is a cross-sectional view of a pressure head with a vacuum groove incorporated in the face for tight fastening of the pressure sensor on a pressure sensor.

FIGS. 3 and 4 show embodiments of the pressure head 9 according to FIG. 2. In the design of FIG. 3, a sealing element 13 is provided in the face 11 of the pressure head 9. This element offers the advantage that the required seal is obtained with fairly small weights or elastic forces. Surface damage of the pressure sensor 1 is thus precluded.

FIG. 4 shows a variant of the pressure head 9 wherein the required pressure force of the pressure head 9 is produced by vacuum suction. For this purpose, a vacuum groove 14 is incorporated in the face 11 of the pressure head 9. The groove is connected with a means for production of a negative pressure to generate a sealing force.

It is of course alternatively possible to provide the embodiments of FIGS. 3 and 4 with a pressure head 1 of FIG. 1. Alternatively, a combination of the two embodiments with one another is also possible.

Figure 5:
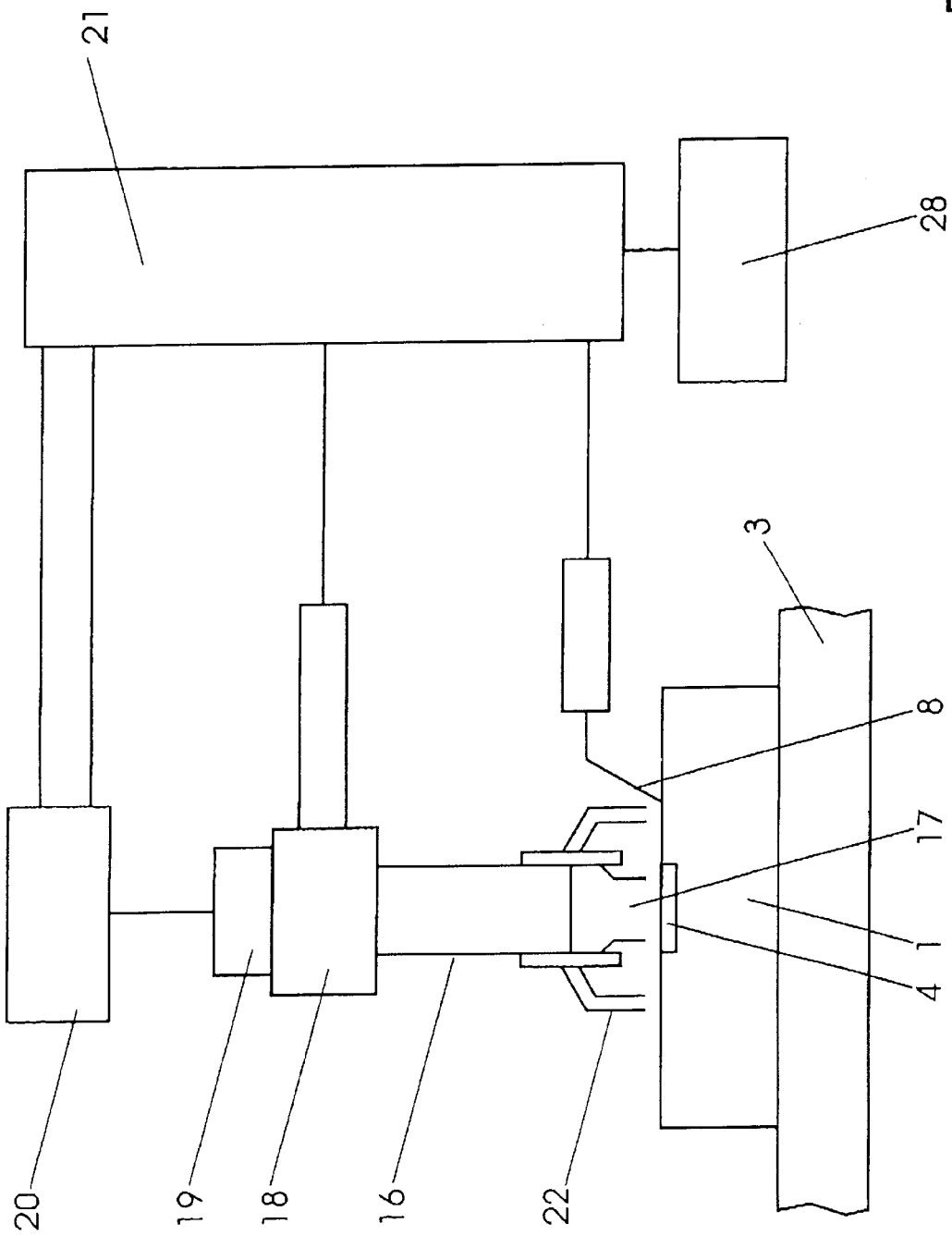
FIG. 5 is a cross-sectional view of another embodiment of the invention with a pressure head for the production of dynamic pressure.

FIG. 5 shows an embodiment of the invention wherein the required pressure is produced dynamically by a stagnation pressure. To this end, a pressure head 15 is provided for production of a flow in the direction of the sensor intake 6, or of a sensor element, of a selected pressure sensor 1 to produce a stagnation pressure. To this end, the pressure head 15 is provided with a vertically aligned tubule 16 whose lower opening 17 ends at a specified distance above the pressure sensor 1. The other end of tubule 16 is connected to a pressure-measuring chamber 18 and, via a throttle 19, to a pressure regulator 20 for a test pressure supply line. In this arrangement, contactless measurement can be made with the pressure head 15. As already described, the pressure sensor 1 can be fastened to a thermochuck 3.

Generally, the pressure regulator 20 and the pressure-measuring chamber 18 for determination of the actual pressure on or in the pressure sensor 1 are connected to an electrical drive and evaluation unit 21. In addition, a plurality of needle probes 22 can be provided on the tubule 16 in the region of the lower opening 17 for establishing electrical contact to the electrical connections 7 of the pressure sensor 1. Such probes are capable of being mounted in the elastic region on the pressure sensor 1. Alternatively, a test card may be provided for electrical contacting of the electrical connections 7 of each selected pressure sensor 1. The pressure head 15 is positionable independently of the test card or together with the test card with respect to the selected pressure sensor 1. In either case, the needle probes 22 on the tubule or the needle probes of the test card are connected with the electrical drive and evaluation unit 21.

Figure 6:
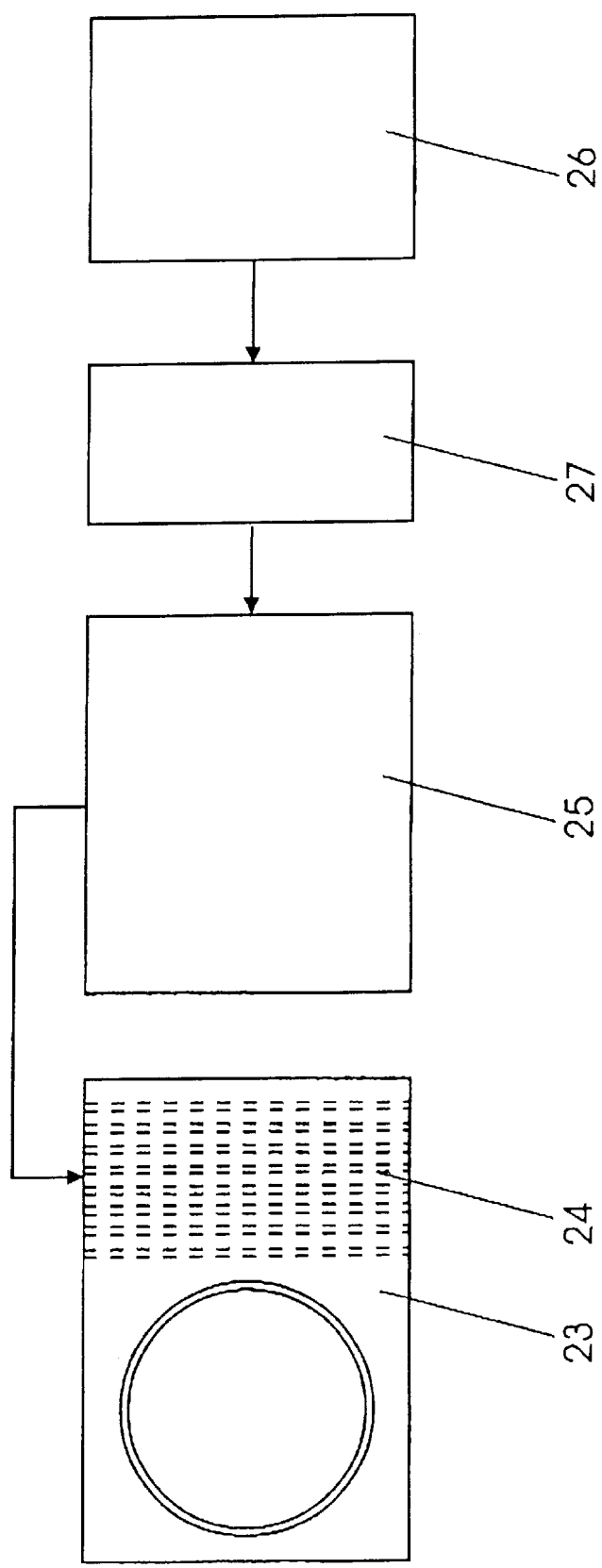
FIG. 6 is a schematic representation of an additional embodiment of the invention, wherein the pressure sensors located in a wafer structure on a thermochuck are exposed groupwise to a specified pressure and at the same time vacuum suction is applied to the thermochuck.

FIG. 6 shows an embodiment of the invention that is suitable for pressure sensors in which the sensor intakes 6 are arranged on one side of the pressure sensor 1 and the electrical connections 7 are arranged on the opposite side of the pressure sensor. For such pressure sensors, a thermochuck 23 is provided for the accommodation of pressure sensors 1 located in the wafer structure. The thermochuck is provided with a grid of holes 24 that matches the grid of the sensor intakes 6 of the pressure sensors 1 in the wafer structure. Here, the wafer 2 is arranged face down on the thermochuck 23 in such a way that each sensor intake 6 of a pressure sensor 1 is substantially aligned with a hole 24 in the thermochuck 23. This requires that the grid of sensor intakes 6 match the grid of the holes 24 in the thermochuck 23.

In order to apply pressure on the pressure sensors 1, the holes 24 in the thermochuck 23 are connected individually, groupwise, or linewise with a control box 25. The holes 24 are selectively connectable through the control box 25 with a device for producing a positive pressure or with a device for producing a negative pressure.

Measurement of the pressure sensors 1 of a selected line is effected in such a way that the corresponding line of the holes 24 in the thermochuck 23 are supplied with a positive pressure and the respective adjacent lines with a negative pressure. This ensures that the pressure sensors 1 are held securely on the thermochuck 23.

Electrical drive of the control box 25 is effected by an electrical control circuit 26 and a multiplexer 27. Evaluation and storage of the test results may then be effected with an ordinary computer 28.

In all embodiments of the invention, air is preferably used as medium for production of static pressure or of stagnation pressure. In principle, however, it is alternatively possible to use special gases, e.g., nitrogen, or alternatively fluids, for this purpose.

What is claimed is:

1. A tester for pressure sensors, either in a wafer structure or isolated, comprising:

a recess for receiving the pressure sensors;

means for electrically connecting at least one of the pressure sensors to an evaluation unit;

means for exerting one of a static and a dynamic pressure of a specified amount and duration on a sensor element of the at least one selected pressure sensor such that the sensor element is displaced from a resting position.

2. The tester according to claim 1, wherein the means is designed as a pressure chamber for the production of a static pressure, in which the tester is at least partially arranged with the pressure sensors located in the recess.

3. The tester according to claim 2, wherein at least the selected pressure sensors are arranged within the pressure chamber.

4. The tester according to claim 1, wherein a pressure head is provided which includes an interior space having an open face on one side, the open face is capable of being mounted on the pressure sensor such that the interior space is tightly sealed by the latter.

5. The tester according to claim 4, wherein the pressure head is connected with a means for production of a specified pressure in the interior space of the pressure head.

6. The tester according to claim 4, further comprising a pressure-measuring probe arranged in the interior space of the pressure head.

7. The tester according to claim 4, wherein means for electrical contacting of the electrical connections of the pressure sensor is assigned to the pressure head.

8. The tester according to claim 7, wherein the means for electrical contacting comprise needle probes for electrical contacting of the electrical connections of the pressure sensor, the needle probes being arranged in the interior space of the pressure head.

9. The tester according to claim 1, wherein the means for electrical contacting of the electrical connections of the pressure sensor and the pressure head are positionable independently of one another with respect to the selected pressure sensor.

10. The tester according to claim 4, wherein the pressure head is capable of being mounted on the pressure sensor with a specified compressive force.

11. The tester according to claim 10, wherein the compressive force is produced by one of a weight and an elastic force.

12. The tester according to claim 4, wherein the open face is designed as a sealing face.

13. The tester according to claim 4, wherein a sealing element is inserted in the open face.

14. The tester according to claim 4, wherein a vacuum groove that is connected with a means for production of a negative pressure is incorporated in the open face.

15. The tester according to claim 1, wherein a thermochuck is provided for the accommodation of pressure sensors located in the wafer structure, in that the wafer is arranged face down on the thermochuck such that sensor intakes of the pressure sensors are arranged in a grid and rest directly on the thermochuck, the thermochuck being provided with a grid of holes substantially aligned with the grid of the sensor intakes.

16. The tester according to claim 15, wherein the holes are selectively individually connectable with a means for production with one of a positive pressure or with a means for production of a negative pressure.

17. The tester according to claim 15, wherein the holes are capable of being acted on by pressure, groupwise or linewise, and the holes adjacent to the group or line are capable of being acted on by negative pressure, groupwise or linewise.

18. The tester according to claim 1, wherein a pressure head for production of a flow in the direction of a sensor intake of the pressure sensors for production of a stagnation pressure is provided.

19. The tester according to claim 18, wherein the pressure head is provided with a vertically aligned tubule having a lower opening ending at a specified distance above the pressure sensor and having a second end connected with a pressure-measuring chamber and a test pressure supply line.

20. The tester according to claim 17, wherein a plurality of needle probes are provided at the tubule proximate its lower opening, for electrical contacting of the electrical connections of the pressure sensor.

21. The tester according to claim 20, wherein the needle probes are capable of being mounted on the electrical connections of the pressure sensor in the elastic region.

22. The tester according to claim 18, wherein a test card is provided for electrical contacting of each selected pressure sensor, and in that a pressure head is positionable on the selected pressure sensor independently of the test card.

23. The tester according to claim 18 wherein a test card for electrical contacting of each selected pressure sensor is provided, and in that a pressure head is positionable on the selected pressure sensor jointly with the test card.

24. The tester according to claim 4, wherein the pressure head is fastened to an X-Y-Z cross table.

* * * * *